July 16, 1968
A. SCHURE ETAL
3,392,460
CARTRIDGE-TYPE TEACHING DEVICE
Filed Aug. 6, 1962
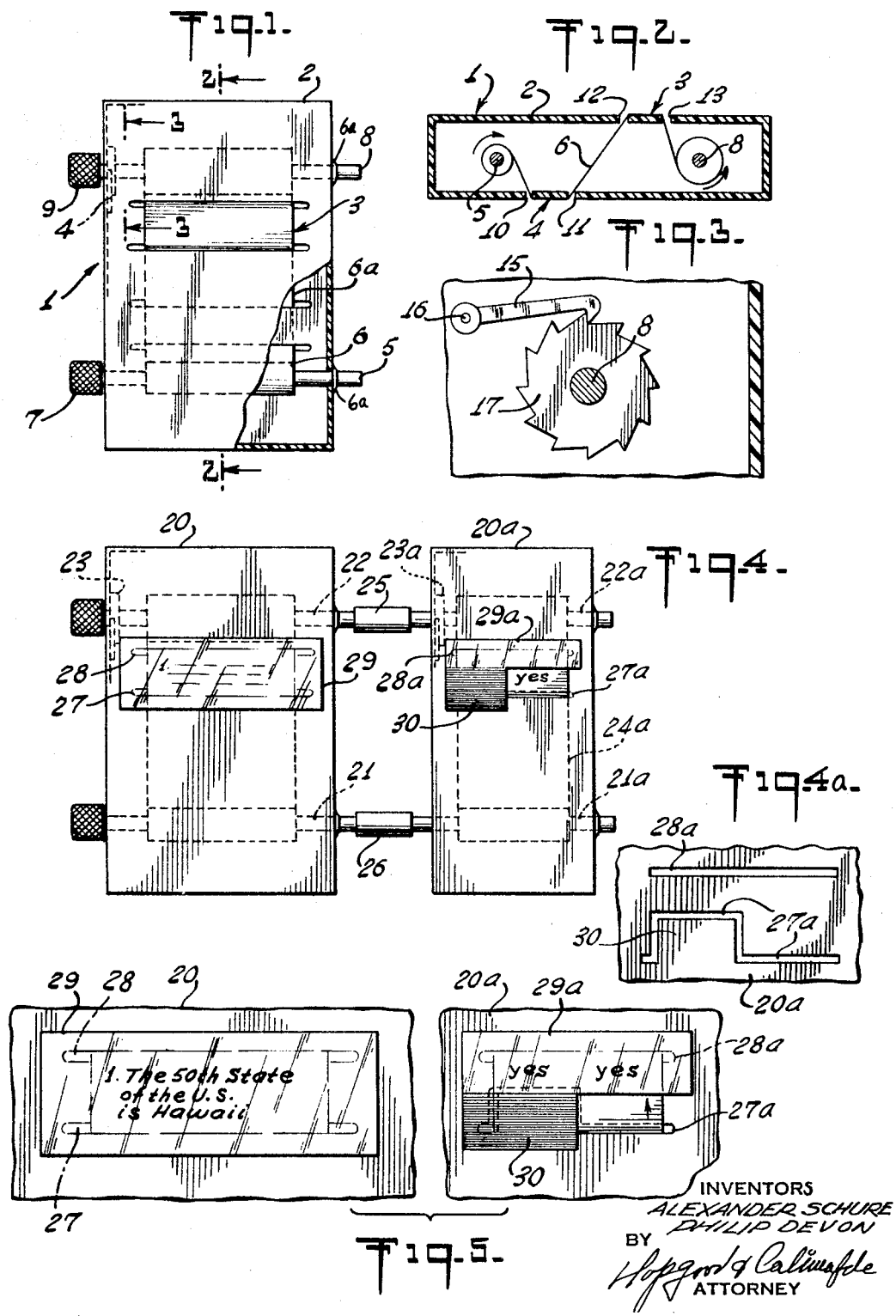
INVENTORS
ALEXANDER SCHURE
PHILIP DEVON
BY
Hopgood & Calimafde
ATTORNEY

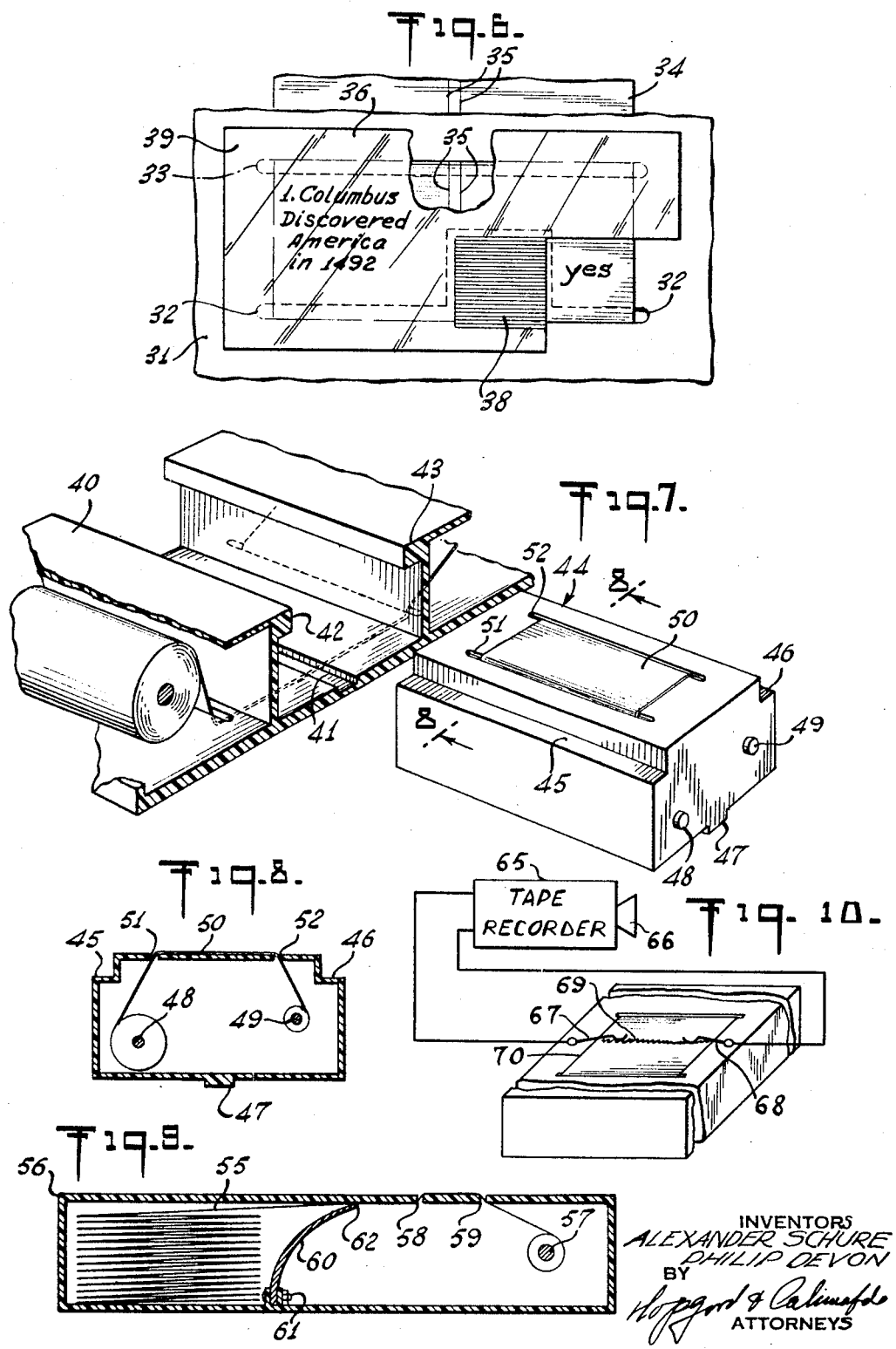

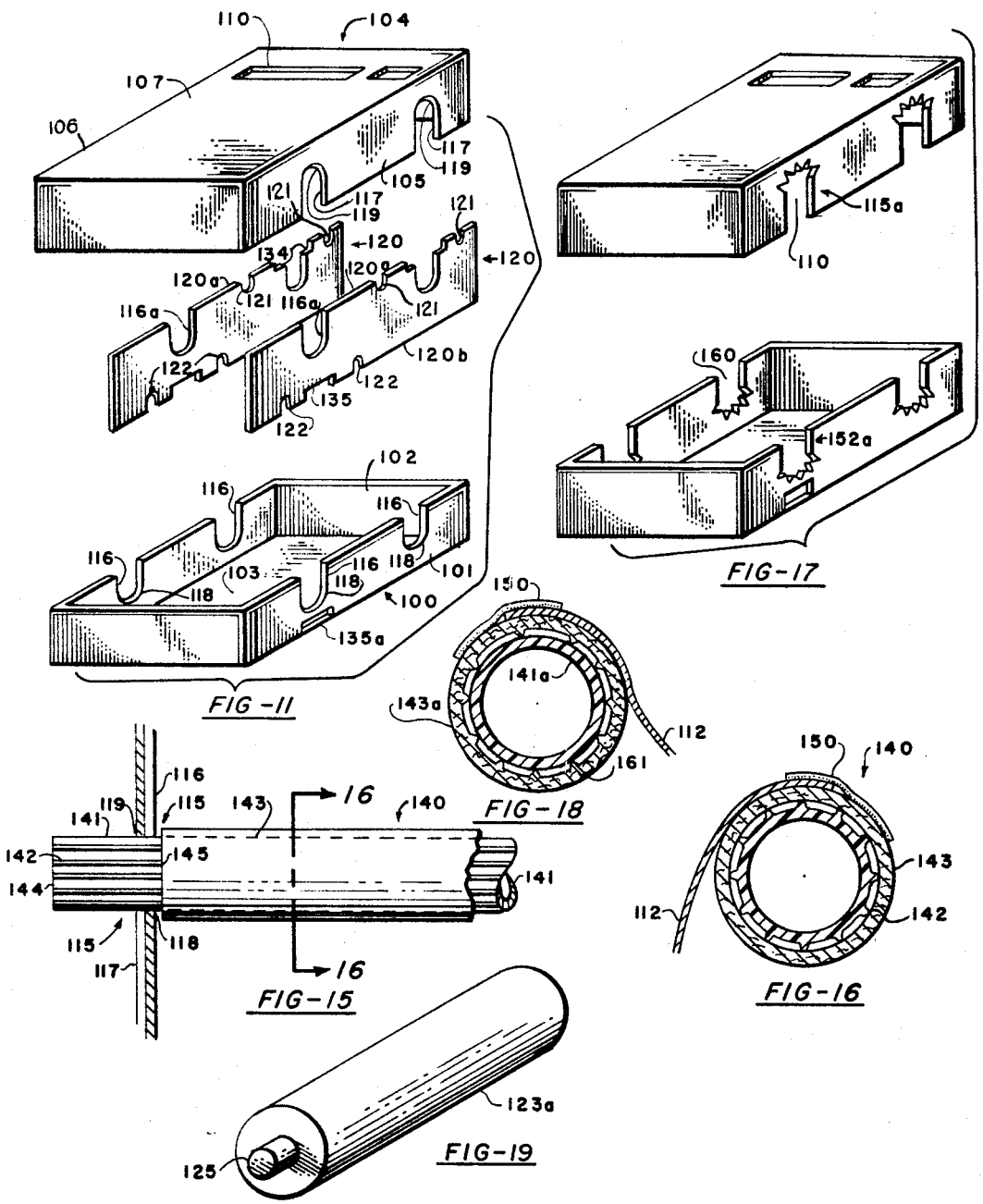

July 16, 1968   A. SCHURE ET AL   3,392,460
CARTRIDGE-TYPE TEACHING DEVICE
Filed Aug. 6, 1962   7 Sheets-Sheet 4

INVENTOR.
ALEXANDER SCHURE
BY PHILIP DEVON
Edward Halle
ATTORNEY

July 16, 1968     A. SCHURE ETAL     3,392,460
CARTRIDGE-TYPE TEACHING DEVICE
Filed Aug. 6, 1962     7 Sheets-Sheet 5
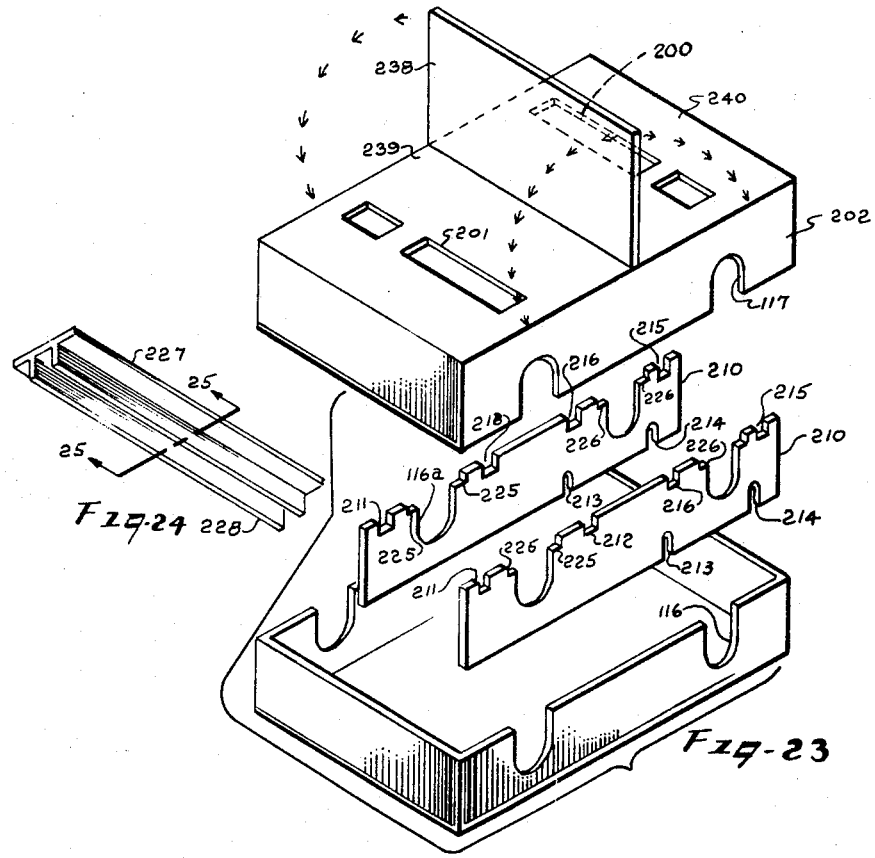
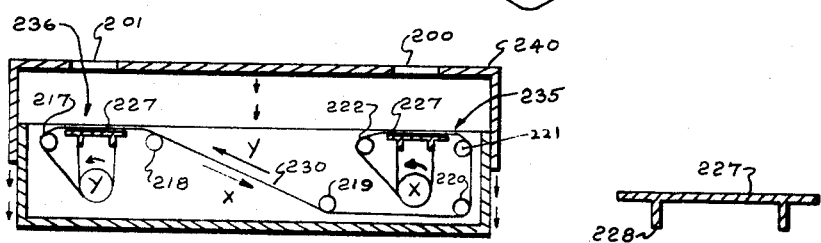
INVENTOR.
ALEXANDER SCHURE
PHILIP DEVON
BY
Edward Halle
ATTORNEY July 16, 1968     A. SCHURE ET AL     3,392,460
CARTRIDGE-TYPE TEACHING DEVICE
Filed Aug. 8, 1962     7 Sheets-Sheet 6
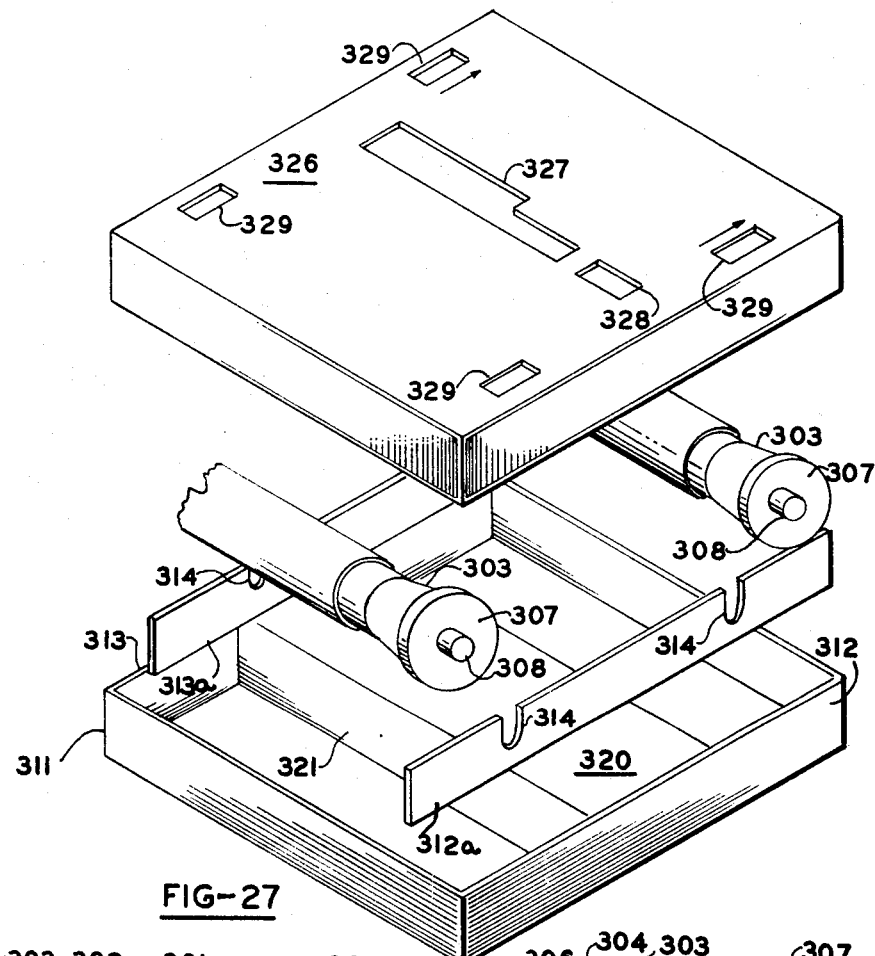
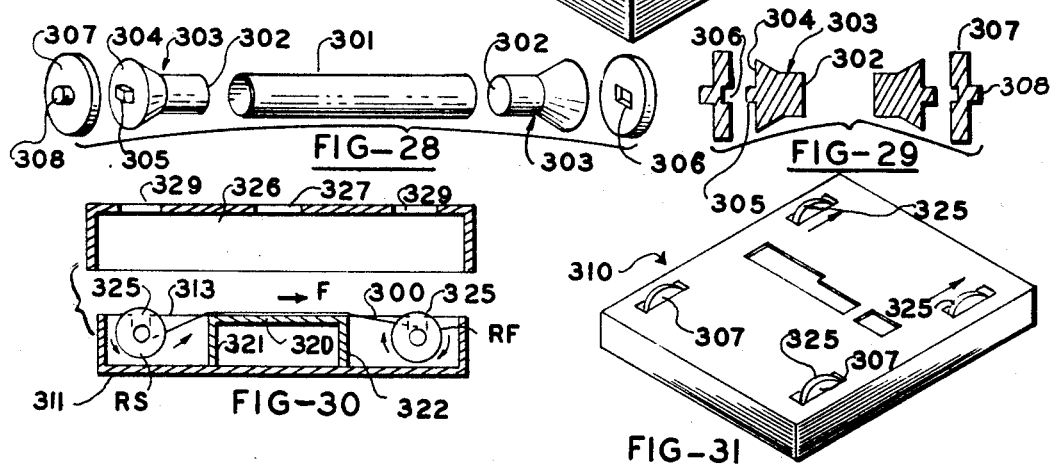
INVENTORS
ALEXANDER SCHURE
BY PHILIP DEVON
Edward Halle ATTY.

July 16, 1968 A. SCHURE ET AL 3,392,460
CARTRIDGE-TYPE TEACHING DEVICE
Filed Aug. 6, 1962 7 Sheets-Sheet 7
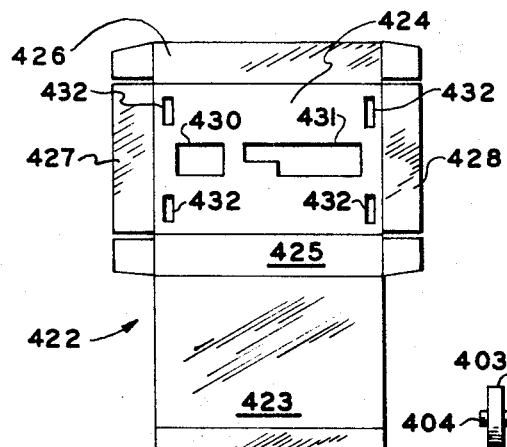
FIG-33
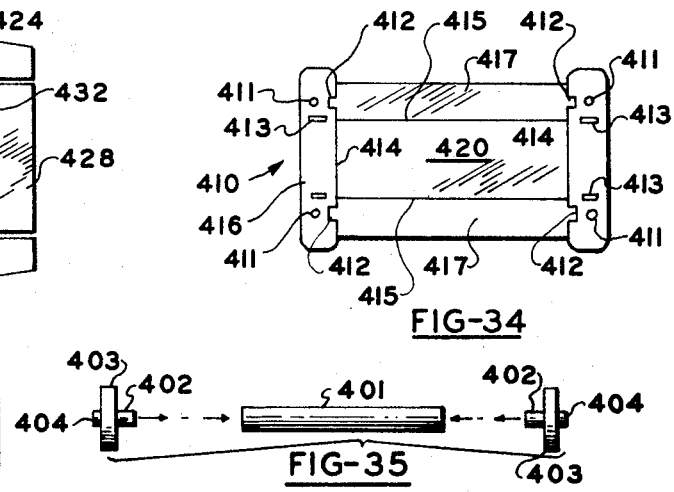
FIG-34
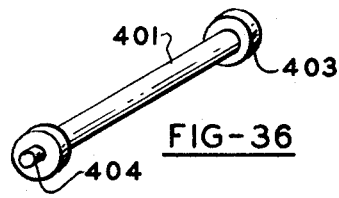
FIG-35
FIG-36
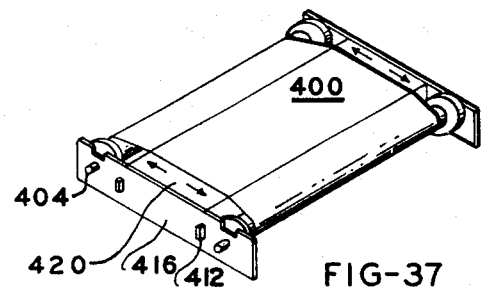
FIG-37
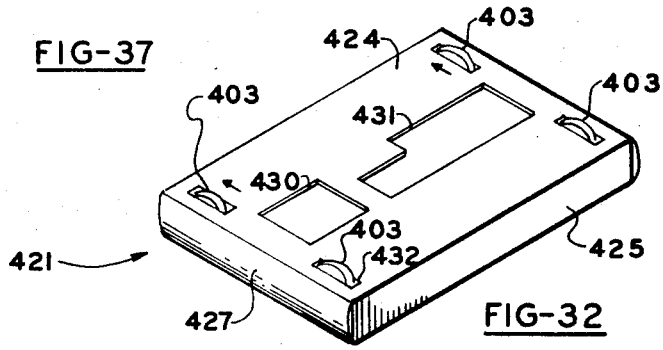
FIG-32
INVENTOR.
ALEXANDER SCHURE
BY PHILIP DEVON
Edward Halle
ATTORNEY

United States Patent Office 3,392,460
Patented July 16, 1968

3,392,460
CARTRIDGE-TYPE TEACHING DEVICE
Alexander Schure, Belle Harbor, and Philip Devon, Long Beach, N.Y., assignors, by mesne assignments, to Educational Aids Publishing Corp., Carle Place, N.Y., a corporation of New York
Continuation-in-part of application Ser. No. 95,223, Mar. 13, 1961. This application Aug. 6, 1962, Ser. No. 215,204
4 Claims. (Cl. 35—9)

This invention relates to a cartridge-type teaching device, and is a continuation-in-part of our copending application for Teaching Device filed Mar. 13, 1961, Ser. No. 95,223, now Patent No. 3,046,675, issued July 31, 1962, and a continuation-in-part of our copending application for Cartridge-type Teaching Device filed Feb. 5, 1962, Ser. No. 171,313, now abandoned.

As has become known in recent years, there is a pressing need for a new technique in educational methods. The need is a result of the increasing population and the inadequacy of the present sources of teacher supply and school facilities. As a result of these and other pressures on the educational system and methods, considerable effort and money have been expended to improve the efficiency of the educational process.

Recently, teaching machines have been proposed which represent a new type of equipment in education. The teaching machines have made a dramatic impact upon the educational process and give promise of greatly increasing the efficiency of the educational process.

As is known, teaching machines are devices which increase the teacher's control over learning activities within a classroom. They are primarily designed as a tool for the teacher. In this sense, they are analogous to books, radio, closed circuit television, motion pictures and other teaching devices. They present information as one of their prime functions.

Although the invention will be described as an institutional teaching aid with compromise proof features, the invention may also be used as a self-educational aid for home use and the compromise proof features need not be employed. For example, the novel teaching device may be used as a supplement with encyclopedias now becoming so popular for home use.

In copending application of Alexander Schure, Ser. No. 69,599, filed Nov. 16, 1960, now Patent No. 3,046,675, issued July 31, 1962, there is disclosed an improved teaching device which may be manufactured relatively inexpensively as compared with other known teaching devices. The device of this invention, however, involves a novel concept of enclosing the teaching material within a modular form which may be used individually or in combination with other similar forms to increase the functional and educational capabilities of the device. By providing a basic unit or module, including a cartridge for containing the material bearing stimuli, the device is relatively inexpensive to manufacture, permits use of the device at home or in the classroom, and effectively extends the application of the device to an unlimited range of areas and subjects. This almost unlimited versatility of the novel device is made possible through a simple substitution of cartridges within a module, each cartridge containing different subject matter.

Another object of the invention is to provide a compromise-proof cartridge-type teaching device or modular unit which can be easily loaded in a teaching machine.

A further object is to provide a programed cartridge-type teaching device capable of being used over and over again for use in combination with another cartridge-type device containing a disposable response sheet.

A still further object is to provide a cartridge-type teaching device adapted to contain both program and answer sheets, and which in itself is adapted for use in determining the student's response to the educational content of the device.

These and other objects will more clearly appear when taken in conjunction with the following description and the accompanying drawings, wherein:

FIG. 1 illustrates one embodiment of a modular form provided by our invention partially broken away to show more clearly the structure thereof;

FIG. 2 is a cross section taken along line 2—2 of FIG. 1;

FIG. 3 is an enlarged cross section taken along line 3—3 of FIG. 1 showing the details of a pawl and ratchet arrangement which may be used with the cartridge;

FIG. 4 depicts a tandem-type arrangement of a program module associated with an answer module;

FIG. 4a is an enlarged fragment of an answer module showing in more detail the slots which make up the observation station;

FIG. 5 is an enlarged fragment of FIG. 4 showing the relation between the program sheet and the answer sheet of the two cartridges;

FIG. 6 shows fragmentarily the window of a module in which the same sheet material is adapted to contain both the program stimuli and the response;

FIG. 7 is illustrative of one embodiment of a cartridge adapted to be inserted into a portion of a module;

FIG. 8 is a cross section taken along the line 8—8 of FIG. 7;

FIG. 9 is a cross section of another embodiment of a cartridge in which only one spool is employed;

FIG. 10 is a simplified diagrammatic illustration of an educational device operated by contact buttons on the response sheet;

FIG. 11 shows components of a modified form of the invention in exploded perspective;

FIG. 15 is a detail of the web storage and reeling means of the device associated with a bearing of the device;

FIG. 16 is a cross section along the lines 16—16 in FIG. 15;

FIG. 17 shows components of a modified form of the invention in exploded perspective;

FIG. 18 is a cross section of an alternate form of web storage and reeling means;

FIG. 19 shows an idler roller of the device;

FIG. 23 shows components of a modified form of the invention in exploded perspective;

FIG. 24 is a perspective view of a working surface means;

FIG. 25 is a sectional view along the lines 25—25 in FIG. 24;

FIG. 26 is a diagrammatic view of a side elevation of the device as shown in FIG. 23 to show the method and structure of reeling the web;

FIG. 27 shows components of another modified form of the invention is exploded perspective;

FIG. 28 is a perspective view of the alternate form of web reeling and storage mechanism as used in the form of invention shown in FIG. 27;

FIG. 29 shows the reeling mechanism in medial cross section;

FIG. 30 is a sectional view of the form of device shown in FIG. 27 with cover lifted;

FIG. 31 is a perspective view of the form of device shown in FIG. 27 assembled and ready for use;

FIG. 32 is a perspective view of another modified form of the invention;

FIG. 33 is a plan view of a blank used in manufacturing the box of the form of invention shown in FIG. 32;

FIG. 34 is a plan view of a blank also used in manufacturing the modified form of invention as shown in FIG. 32;

FIG. 35 is a side elevation of a roller with parts in extended position;

FIG. 36 is a perspective view of the roller shown in FIG. 35; and

FIG. 37 shows the blank of FIG. 34 folded into position in combination with a pair of rollers as shown in FIG. 36 containing a web of program material.

Similar numerals refer to similar parts throughout the several views.

Figures 20, 21, 22:
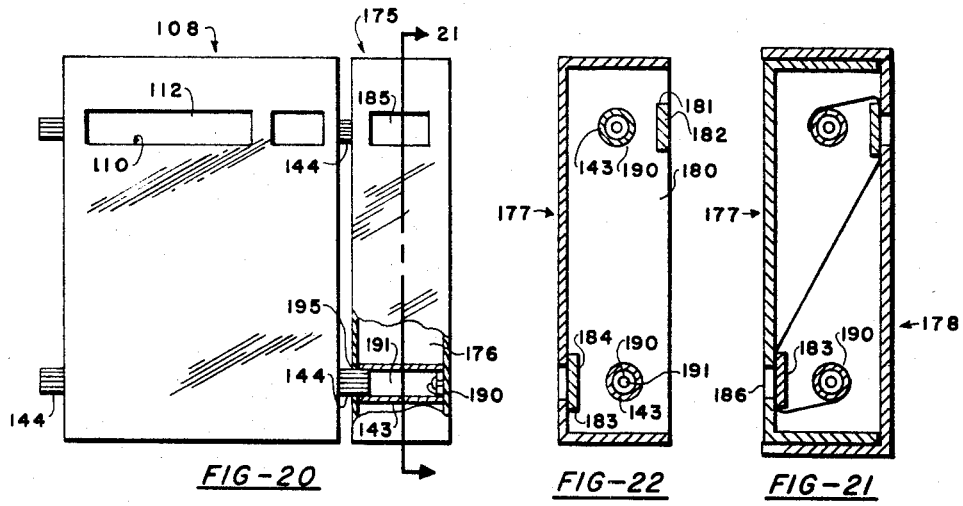
FIG. 20 is a top plan view of a pair of cartridges made in accordance with the invention.
FIG. 21 is a cross section along the lines 21—21 in FIG. 20.
FIG. 22 is a sectional view similar to FIG. 21 with the top cover and other components removed.

In accordance with the broad aspects of our invention, we provide a cartridge-type teaching device comprising a housing, an observation station associated with a surface of said housing, means within said housing for supporting sheet material containing stimuli including means for progressively moving at least a portion of said sheet material to the observation station, means for exposing a predetermined portion of sheet material containing stimuli to be observed at said observation station, and means within said housing for receiving and storing at least said predetermined portion after said portion has passed the observation station.

The foregoing basic modular unit, i.e., cartridge and housing, permits the handling of all or part of the program and, as stated hereinbefore, is advantageous in relieving the teacher of loading or unloading responsibilities and in permitting ready storage of the program for immediate use according to subject matter. The units are enclosed and are adapted to feed one or more rolls or slips of paper from the bottom to the top, or the top to the bottom, or from top to bottom and back to the top again, depending on the arrangement of the observation station or window associated with the housing.

The cartridge or modular unit may contain as an integral part of its structure a spring, clip, ratchet or other device to constrain the direction of motion so as to allow feeding of sheet material in one direction only. However, one of the important advantages of the invention resides in the unique construction of the observation station which eliminates the necessity for separate constructional means to constrain the direction of motion. The modular unit may be arranged with two or more windows (observation stations), on opposed surfaces of the housing with the paper feed in between so that stimuli may be printed on both sides of the paper and observed without reversing the cartridge.

In a preferred embodiment, two or more separate cartridges may be used; one for the presentation of the educational program, and the second for the correct answers with additional space for the student to write in his response. This embodiment has the advantage of permitting continuous re-use of the educational program. Of course, one cartridge housing both program and answer space may be utilized, although the distinct advantages of a disposable answer section are apparent. The student operates the machine by placing the cartridges into operable position and then manipulates the program cartridge to expose the stimuli constituting the first item. The answer cartridge, which has been similarly loaded and which lies alongside the program cartridge shows a blank space with a corresponding number where the student will write his response. After writing the answer, the student advances the answer cartridge, bringing into view the correct answer which had been hidden by any suitable masking or obscuring means and observes the correct answer which now lies in close proximity to his response. The answer cartridge is now positioned for the next answer.

Of course, the most economical embodiment does not include mechanical springs, grippers, or other devices which prevent paper slippage, and also eliminates the ratchet necessary to keep the paper moving in one direction only. In the cartridge dealing with the program, which is the modular unit presenting the items to be answered, the slot is so structured as to cause the paper to be fed under tension between slots lying on the top and the bottom of the box. A plastic or other type of window at the observation station may be utilized to prevent the paper from being soiled. On the answer cartridge, the same type of slot is used with an appropriate mask to conceal the correct answer while the student is writing his answer, without any possibility of compromise on the part of the student. The sheet is preferably in the form of a reel containing the answers and the answer spaces, and is inserted in the second module in such manner as to eliminate external dowels or handles which could be turned to move the paper in reverse direction. That is, the student may turn the answer sheet in one direction only. When he has completed all of the questions, he has a neatly rolled, sealed cartridge which he may turn in to the instructor. The instructor may then issue another question cartridge for use in the same modular unit and another answer cartridge for the tandem unit. Alternatively, the question cartridge may be handed to another student with a new answer cartridge. In this manner, the teacher may utilize the modulator machine many times during the class day in many different ways to effectuate optimum teaching efficiency.

The modular form which encloses the program cartridge may be so structured as to house the answer cartridge within it simply by providing an opening, which may be left opened or sealed at the discretion of the designer, under each of the tension slots. The answer cartridge would be slipped into position directly underneath each of the tension slots. The observation window cut opposite the slots into the frame would permit a unit package of very convenient shape and relatively small size, and reduce the answer cartridge to dimensions easy to handle. The answer cartridge would contain its own dowel. The modular form of the machine could, of course, be constituted of wood, paper, cardboard, plastic or other suitable materials, depending upon the choice of the designer.

As illustrative of one embodiment of the invention, reference is made to FIG. 1 (partially broken away for purpose of clarity) which depicts a modular unit designated generally by the numeral 1 comprising a housing 2 formed of top, bottom and side walls as shown. The top surface of the housing has an observation station designated generally as 3 and a similar observation station 4 at the bottom surface thereof. A spool 5 containing a roll of paper 6 of program material is provided at one end of the housing axially supported at the sides thereof, the spool having a knurled head 7 as shown. A takeup spool 8 with knurled head 9 is provided at the other end of the housing for taking up the sheet material, the sheet material passing through slots in the housing (note FIG. 2) so as to expose stimuli on said sheet for observation at stations or windows 3 and 4. The spools 5 and 8 are axially stabilized by means of star washers 6a or the like. Thus, as sheet 6 is positively unraveled from spool 5 during take-up of spool 8, the sheet passes through slot 10 and over the outside bottom surface of the housing, then through slot 11 and diagonally through the interior of the housing through slot 12 over the top surface of the housing, down through slot 13 and around spool 8. The sheet moves in the direction of the arrow indicated at station 3 of FIG. 1 while the student observes or studies the educational content of the sheet. As is apparent, only a portion of the sheet is exposed, the remainder of the unravelled sheets being masked by the housing itself. The unique arrangement of providing observation stations on opposite sides of the housing permits both sides of the program sheet 6 to be used conveniently by simply reversing the position of the box.

Although we have found that the inter-twining of the paper sheet through the housing adequately restrains the sheet against slippage, if desired a pawl and ratchet wheel combination (note FIG. 1) is provided which is shown more clearly in the enlarged cross section of FIG. 3, as viewed along line 3—3 of FIG. 1. The pawl 15 is pivotally connected to side wall means of the housing via pin 16 with the end of the pawl riding the teeth of ratchet wheel 17 as shown, but being adapted to lock the wheel when it tries to move in the opposite direction; the wheel 7, of course, being integral with or rigidly attached to the spool 8 by any suitable means. Alternatively, a spring may be employed which permits only unidirectional rotation of the spools.

In the basic unit shown in FIGS. 1 and 2, only one observation station need be provided, although, as previously explained, two observation stations have the advantage of utilizing both sides of the program sheet. Thus, as the sheet nears its end of travel at station 3, warning stimuli would appear advising the observer to reverse the housing or turn over the cartridge for the next program of material.

We find one embodiment of our invention particularly valuable in presenting prompts, questions, stimuli and the like, while concealing the correct response or answer until predetermined conditions are fulfilled. Such an embodiment is shown in FIG. 4 where two basic modular units are employed, one containing the programmed material, the other with the corresponding correct answers predeterminedly concealed until the question has been answered by the student by recording in the place provided on the answer sheet in the other unit.

Referring to FIG. 4, two cartridges are shown 20 and 20a, both similarly provided with unwinding spools 21 and 21a and take-up spools 22 and 22a. Two pawl and ratchet wheel combinations 23 and 23a may also be provided if desired in association with the take-up spools. A question or program sheet 24 is associated with the spools of cartridge 20 and an answer sheet 24a with the spools of cartridge 20a. The two cartridges are preferably, although not necessarily, synchronously associated together with e.g., flexible couplings 25 and 26, e.g., heavy rubber tubing, so that as program sheet 24 is fed from unwinding spool 21 to take-up spool 22, answer sheet 24a moves with it. Other forms of rigid or flexible coupling will be apparent to those skilled in the art. It will be appreciated that the cartridges need not be connected together but operated separately, provided one is positioned relative to the other so that predetermined portions on each sheet correspond indicia for indicia. If it is not desired to synchronize the movement of the spools, the dowels extending through one unit, e.g., the program unit may be used to support and guide the answer unit by simply passing through the side walls thereof.

As in FIG. 1, the modular unit 20 of FIG. 4 has a window or observation station determined by two parallel slots 27, 28 through which the program or question sheet is threaded as described for FIG. 1. In order to protect the sheet from being soiled or render it tamper-proof, a transparent covering 29 of plastic sheathing or other material is secured to the surface of the module, the upper and lower margins thereof being free to allow for traversing of the program sheet beneath the covering.

Similarly, cartridge 20a is provided with a window or observation station determined by slots 27a, 28a. the lower slot 27a is angularly configurated to provide opaque tongue or mask 30 which conceals a correct answer on the answer sheet while the observer is recording his answer in an adjacent space left for that purpose. The arrangement of slot 27a and tongue 30 is more easily discernable in FIG. 4A. A transparent covering 29a is similarly provided secured on top of the window of module 20a to insure an answer sheet that is compromise proof. A cut-out is provided at the right hand corner of the transparent covering in order to provide accessibility to a predetermined portion of the answer sheet for recording the observer's answers.

Thus, assuming question No. 1, calling for a yes or no answer, has been exposed on a predetemined portion of the program sheet in module 20, the observer writes in an answer, for example "yes," on the portion of the answer sheet provided for that purpose in synchrony with the program sheet. Underneath mask 30, the correct answer is concealed from the observer until the observer records his answer and then moves the answer sheet, or, if preferred, the two sheets synchronously by turning take-up spool 22 to the position shown in FIG. 5 which is a fragmented enlargement of the observation stations shown in FIG. 4.

If desirable, the questions and answers may be associated with a single modular unit. In this connection, the program and answer portion may appear on one and the same sheet, or on two parallel arranged strips, provision being made for a masking means to conceal the correct answer on the answer sheet. One embodiment of a single module is shown fragmentally in FIG. 6 which depicts a fragment of modular unit 31 having slots 32, 33 through which sheet material 34 is threaded as in the other embodiment described hereinabove. The sheet is divided by a pair of dotted lines 35 into two main portions, program portion 36 and answer portion 37. The answer portion is further sub-divided into a correct answer portion concealed by mask 38 associated with slit 32 and a space adjacent the concealed answer for recording the answer of the observer. A transparent covering 39 of plastic or other material is secured to the top of the housing to protect the sheet material and to aid further in rendering the device compromise-proof. The cover has a cut-out in the lower right hand corner adapted to render accessible only that portion of the answer sheet to the observer for the recordation of the answer.

While the foregoing combined program and answer modular unit maintains distraction to a minimum, We prefer a separate program unit as it can be used over and over again without recharging while the combined type, the combined program and answer sheet must be replaced after use by a student.

One of the advantages of our invention is that a cartridge may be produced as a sub-unit for insertion into the modular unit. One such embodiment is shown in FIG. 7 which depicts a fragment of a modular unit 40 having a substantially U-shaped trough having a track or groove 41 at the bottom thereof and inwardly projecting shoulders 42 and 43 at the top portion of the U, said trough being adapted to receive in locking engagement therewith catridge unit designated generally by numeral 44. The upper corners of the cartridge are provided with steps 45 and 46 for cooperating with shoulders 42 and 43 of the larger device. The bottom of the cartridge has a downwardly projecting tongue 47 adapted to ride groove 41 of the module when the cartridge is inserted into the trough. As in the previously described embodiments, cartridge 44 is provided with unwinding and take-up spools 48, 49, respectively, for moving sheet material 50 across the top of the units through slots 51 and 52 (note also FIG. 8).

While the various embodiments depicted in the drawing show the sheet material supported as a coil on an unwinding spool, the sheet material to be fed to the observation station may be stored in other forms. One method is shown in FIG. 9 which is a cross section of a cartridge showing accordian folded sheet or strip material 55 stored within cartridge 56. A take-up spool 57 is provided for winding up the strip as it passes through slots 58 and 59. If desired, a finger or wiper 60 of resiliant material, e.g., spring steel, may be provided anchored by a bolt or screw 61 at the bottom of the cartridge, with the end 62 of the finger being adapted to maintain continual pressure against the strip and the underside of the top of the cartridge so as to provide the necessary tension on the strip as it passes through the slots.

It may be desirable to utilize the novel teaching device in combination with another form of educational tool, such as an audio or visual device, along the lines mentioned in co-pending application Ser. No. 69,599. Thus, the teaching device provided by our invention may be provided with means for automatically controlling the operation of the additional educational tool. Various kinds of response means may be employed, such as conductive ink or printed circuitry carried on one of the strips in the cartridge. For example, the marking of a heavy lead pencil in the answer column might be sufficient in cooperation with other circuitry electrically to couple in an audio device, e.g., a tape recorder, a visual scoring light, etc. In FIG. 10 we show one combination in which we utilize as an educational tool a tape recorder 65 having a loudspeaker 66 contained within an insertable cartridge such as shown in FIG. 7. At predetermined intervals on the response sheet, e.g., after a series of questions covering one aspect of a subject or at the conclusion of a lesson, the response sheet is provided with button contacts 67, 68 and printed strip 69 on sheet 70 to complete the power circuit for the recorder, whereby the record is automatically set into operation. Alternatively, the response sheet may be perforated, and the perforations sensed by suitable sensing means to operate the recorder.

Figures 12, 13:
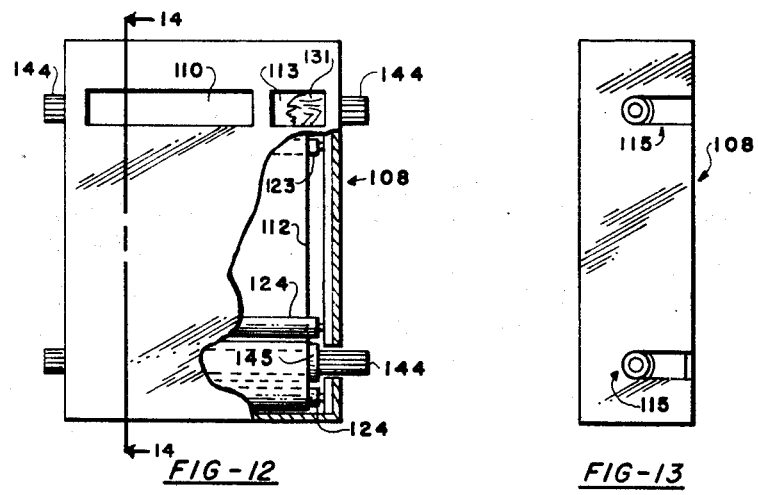
FIG. 12 is a top plan view of the form shown in FIG. 11 with parts cut away.
FIG. 13 is a side elevation with some components in phantom.
Figure 14:
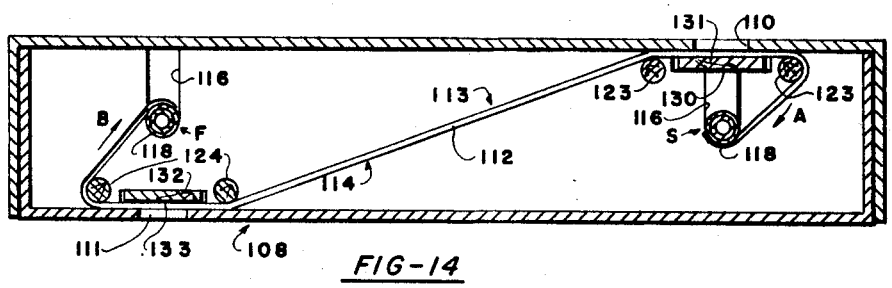
FIG. 14 is a cross section along the lines 14—14 in FIG. 12.

In another form of our invention shown in FIGS. 11 through 16, we provide a teaching device made up in box-like fashion with a bottom frame portion 100 having side walls 101 and end walls 102 as well as a bottom 103. There is also a top frame portion 104 with side walls 105 and 106 and a top surface 107. The top portion 104 is relatively larger than the bottom portion 100 so that it may be adapted to slide fit over the bottom portion to make a box-like enclosure or housing 108 as illustrated in FIGS. 12, 13 and 14 of the drawings.

Lower walls 101 and 102 should fit within upper walls 105 and 106 to provide substantial registration between the outer sides of the said lower walls and the inner sides of the said upper walls. This will add to the sturdiness of the assembled box-like device, or housing 108.

There is at least one observation station 110 in upper surface 104, and at least one observation station 111 in lower surface 103. The number of observation stations on each surface may be varied to suit the particular teaching purpose of the device.

Since the purpose of our invention is to provide a teaching means in connection with a web or tape 112, on which various stimuli means or programs are placed, it is desirable to have means to present different portions of the web to the said observation stations 110 and 111. It is also desirable to use both sides of the web 112, and to provide that the first, or face side 113, will be presented to one of the observation stations such as observation station 110, and the reverse, or back side 114, of the web, should be presented to another of the observation stations such as observation station 111. In this manner, both sides 113 and 114 of web 112 may be utilized by completely reeling the web first in a forward direction and observing its portions through observation station 110, and then turning over device 108 and reeling the web back in reverse direction to observe the other side 114 through observation station 111.

We have provided novel and simple means to accomplish this as follows: Bearing means 115 are formed by means of U-shaped slots 116 in the side walls 101 of the bottom portion of the device in cooperation with U-shaped slots 117 in the side walls 105 of top portion 105 of the device. The said slots 116 and 117 are so placed in inverted relationship in the said walls 101 and 105 respectively so that they will be located in opposed pairs in each wall, and the U-shaped semi-circular inner ends 118 of each slot 116 will be registered with U-shaped semi-circular inner ends 119 of each slot 117 in such inverted fashion to form between them a substantially circular bearing 115.

The housing 108 may be made of plywood, plastic, paper or cardboard or any other suitable material. We may also provide side wall inserts 120 which are made of heavy board, plastic, plywood or other material to serve as strengtheners and as internal frame members for the device. These inserts 120 will be particularly helpful, if not necessary, for strengthening purposes and for providing bearing surfaces for the idler rollers 123 and 124, where the housing 108 is made of lightweight cardboard. Each insert will be maintained within the lower frame portion 100 by means of adhesive, nails, rivets or other suitable means, and will have U-shaped slots 116a which will substantially register with U-shaped slots 116. Opposed inserts 120 will also have pairs of idler roller bearings 121 which may be made in the form of U-shaped cuts spaced along both sides of a U-shaped cut 116a, and an upper edge 120a of the insert 120 and other sets of pairs of idler roller bearings 122 placed at the lower edge 120b of inserts 120 so that one set will be on either side of a second pair of opposed U-shaped cuts 116a.

We provide web guide means such as a pair of upper idler rollers or spindles 123 and mount them within bearings 121. Web guide means such as a pair of lower idler rollers 124, which are identical in appearance to upper idler rollers 123, are located and mounted within bearings 122. Each roller 123 or 124, as the case may be, has reduced ends 125 which are adapted to fit within bearings 121 or 122, as the case may be.

This form of our device also has an upper working platform 130 having a writing bar or working surface 131 and a lower working platform 132 having a writing bar or working surface 133. These platforms 130 and 132 may be mounted on suitable shoulders 134 or in seat constructions 135. The upper working platform 130 is fitted into the shoulders 134 in such a manner that it is easily removable and yet will remain in place when top portion 104 is properly placed over bottom portion 100 of the device. This removable type of construction is necessary to permit interchangeable web storage and sealing means 140 to be placed within the U-shaped slots 116 and 116a immediately associated with shoulders 134.

The lower working platform 132 is fitted into and slide fits through seats 135 in the inserts 120 and also through openings 135a in lower side walls 101. The width of U-shaped cuts 119 in upper side walls 105 which fit over openings 135a, when housing 108 is closed, is relatively narrower than the width of opening 135a. Thus, when lower working platform 132 is in position, it will be held in place by the top frame portion 104. When top frame portion 104 is removed, lower working platform 132 may be removed from the device to facilitate loading and removal of interchangeable webs 112. The working platforms 130 and 132 may be made of wood or metal. However, we prefer to make them of an extruded plastic. We find that if the plastic material is black in color, the writing bars 131 and 133 serve as a better writing base underneath the web 112.

The web storage and reeling means 140 comprises a hub 141 extruded from polyethylene having radially extending longitudinal spurs, or projections, 142 around its circumference. Hub 141 may be solid or hollow. We prefer to use the hub 141 which is hollow because it imparts a certain elasticity or resiliency to the completed web storage and reeling means 140. There is a web reeling sleeve 143 made of board of plastic which has an inside diameter substantially equal to the outside diameter of hub 141 including projections 142. Sleeve 143 is adapted to slide fit over hub 141. It is held in place by the friction means provided by the radial projections 142, the edges of which contact the inner surface of sleeve 143. The outer surface of sleeve 143 is adapted to hold and reel a web 112 and end of web 112 is attached to sleve 143 in any manner known to the art such as by the use of adhesives. Sleeve 143 is relatively shorter than hub 141 so that when the web storage and reeling means 140 is placed within a pair of opposed slots 116, the ends 144 of hub 141 will extend a distance outside of the slots and the ends 145 of sleeve 143 will end within the slots 116 or 116a as the case may be. This serves a double purpose. First, ends 145 serve to limit lateral movement of hub 141 and maintain it in position within slots 116a. Secondly, it permits ends 144 to extend beyond slots 116, and when top portion 104 is placed over bottom portion 100, it further permits ends 144 to extend beyond slots 119 leaving a portion of approximately ½" or more which may be grasped by the fingers of a user to rotate the hub 141 and with it, sleeve 143. It is also understood that when the box 108 is in closed position, bearing 115 will be formed around hub end 144, and will have the same relationship to projections 142 as does the sleeve 143 as already described. Thus, another friction means is provided to keep hubs 141 from rotating unless force is applied by means of the fingers or otherwise. This relationship is such that when force to rotate is applied, the web storage and reeling means will readily rotate, and when force is not applied, it will remain in a non-rotating position. Thus, a pair of web storing and reeling means are used in the device 108 to reel a web 112 between them. The web 112 will usually be stored on one of the storage and reeling means 141 prior to being placed in the device 108. This means 141, which we shall designate as F for first in FIG. 14 of the drawings, is placed in the device with the top portion or cover 104 off. A leading edge of web 112 is then reeled and led and reeled around lower idler rollers 124 so that it will be between observation station 111 and lower working surface 133. The web is then led and reeled around upper idler rollers 123 so that it will be between upper observation station 110 and upper working surface 131, and then it is reeled to the other web storage and reeling means 141, designated letter S for second at FIG. 14 of the drawings, where it is fastened to the said sleeve 143 of said means 141 by means of adhesive such as a pressure sensitive adhesive strip 150.

Referring again to FIG. 14 will show that when roller S is rotated clockwise, the web will move in the direction of arrow A and the face or first side 113 will be visible through observation station 110. After the web is completely reeled, the device may be turned over and then means F may be rotated in clockwise direction to move the web in the direction of arrow B, and the reverse or second side 114 of web 112 may be observed through observation station 111. Thus, while unreeling the web 112 originally stored in web storage and reeling means 141 designated as F, a first side 113 may be completely scanned, and in the act of re-reeling the web 112 on means F, the second side 114 may be completely scanned. In this manner, by providing many webs 112 stored on other web storage and reeling means 141, a vast amount of educational stimuli or program material can be viewed and used for educational purposes with this particular type of cartridge or modular device 108 as disclosed in this form of our invention.

In FIGS. 17 and 18 of the drawings, we show alternate bearing, hub and sleeve constructions to provide the radial friction means. In this form of construction, the bearings designated as 115a have inwardly depending projections 160 and the sleeve 143a has inwardly depending longitudinal projections 161. The outer surface of the hub 141a is smooth. Thus, the radial friction means is provided by projections from the bearings 115a and the sleeves 143a in this construction acting on the relatively smooth surface of the hub 141a. While we prefer the construction in which the projections 142 are on the hub 141, we describe this alternate form as being an equivalent construction to provide radial friction means.

In FIGS. 20, 21 and 22, we show how cartridge 108 may be connected to an auxiliary cartridge 175 so that the question material contained on web 112 of cartridge 108 may be used in connection with an answer web 176 of auxiliary or answer cartridge 175. Cartridge 175 has a lower frame portion 177 and an upper frame portion 178, each having walls, a bottom and a top respectively and fitting together to form cartridge 175 in a manner similar to the construction of cartridge housing 108. In this construction, lower side walls 180 are provided with shoulders 181 for writing bars 182 and openings 183 for writing bars 184. One or more observation stations 185, located in upper frame portion 178, are associated with writing bar 182, and one or more observation stations 186, located in lower frame 177, are associated with writing bar 183.

In FIGS. 20 and 21 of the drawings, we show plastic circular buttons 190 affixed to one of lower side walls 180. Buttons 190 have a diameter substantially the same as the inside diameter of web reeling sleeves 143 so that sleeves 143 may be fitted and held in place within cartridge 175 by inserting them over a button 190. Button 190 may be provided to rotate on a rivet 191 or it may be rigidly affixed to wall 180. In either case, sleeve 143 will be permitted to rotate either on the button 190 rotatably affixed to the rivet 191, or by providing a slide friction rotating relationship between a cardboard sleeve 143 and a plastic button 190. A suitable opening 195 is provided by cuts in opposite wall 180 in the same manner as bearings 115 are provided in cartridge 108 so that ends 144 of hubs 141 may enter cartridge 175 and make a friction slide fit within sleeves 143 as shown in FIG. 20 of the drawings. Then when opposite ends 144 of hubs 141 are rotated, sleeves 143 within cartridge 175 will also be rotated and the webs 112 and 176 of both cartridges will move together. Reference to FIG. 21 of the drawings will show the pathway of web 176. Thus, when a particular question appears on web 112 through observation station 110, an appropriate answer portion on web 176 will be available through observation station 185. In this form of the invention, the two cartridges may be operated together with the simple working parts consisting of the hubs 140 and the sleeves 143 friction fitted together and held in bearings 115 and by the buttons 190. This eliminates all forms of pawls, ratchets or other breaking mechanisms.

We have provided a modified form of the device as shown in FIG. 23 of the drawings in which the observation stations 200 and 201 are positioned in the top frame portion 202. In this specification, it is to be understood that an observation station such as 110, 200 and 201, may have one or more viewing openings as desired. Thus, while the term "observation station" may be used in the singular, it will cover such a station having more than one opening.

The bearings means comprising U-shaped slots 116 and 116a and 117 are similar in construction in this form of the device to the bearing means as shown in the form of the invention shown at FIGS. 11 and 15 of the drawings, and the web reeling and storage means for use with this form are like those shown at FIGS. 11 through 19. However, in the form of the device shown in FIG. 23, opposed inserts 210 are provided which have differently arranged idler roller bearings, such as the bearings 211, 212, 213, 214, 215 and 216 which support idler rollers 217, 218, 219, 220, 221 and 222 respectively, as the web guide means.

Inserts 210 also have writing bar or working surface seats 225 and 226 for writing bars or working surface means 227. In this form of the invention, the writing bar is made preferably of a plastic such as modified polystyrene or any other high impact plastic known to the art. The working surface means 227 is designed to seat in the seats 225 and 226, and has a pair of downwardly depending struts 228 which will maintain it in place when properly seated.

Reference to FIG. 26 of the drawings will show the method of reeling web 230. When roller X is rotated in a counter-clockwise direction, the web 230 will move in the direction of arrow marked X. Likewise, when roller Y is moved in a counter-clockwise direction, the web 230 will move in the direction of arrow marked Y, thereby moving in a reverse direction to that of arrow X. Rollers X and Y depict completed web storage and reeling means, such as means 140. Thus, an entire web 230 may be reeled first in the direction of arrow X and then in the direction of arrow Y so that the face, designated by reference numeral 235, will pass beneath observation station 200, and the reverse, designated by reference numeral 236, will pass beneath observation station 201, and all the material on both sides of the web 230 can be observed through either one or the other of the observation stations 200 or 201 on the top surface of the device.

In order to prevent viewing both sides of the web 230 through the observation stations 200 and 201 at the same time, we have provided a flap 238 which may be attached by means of an adhesive tape 239, or any other means, to a medial section on top surface 240 so that it may be flipped to cover either observation station 200 or observation station 201 to render only one of them visible at a time.

In another form of this invention, we may provide a bottom frame structure and reeling mechanism as shown in FIG. 23 of the drawings, together with a top frame structure 107 as shown in FIG. 11 of the drawings. In this form of the invention, top structure 107 provides only one observation station 110 at one end of the structure. A cover such as 107 could be placed on with the observation station 110 directly above the working surface means over roller X as shown in FIG. 26 of the drawings for the purpose of viewing the face 235 of the web 230, and then the cover could be reversed with the observation 110 placed over the position of the working surface means over the roller Y to review the reverse 236 of the web 230. Thus, while one side of the web 230 was being viewed through observation station 110, the other wide of the web 230 could be concealed by the frame structure of top cover 107.

In still another form of this invention, we may provide a structure such as shown in FIG. 27 of the drawings. In this form of invention, the web 300 is reeled on web reeling sleeve 301 which is similar in construction to web reeling sleeve 143 mentioned hereinabove, and is made of board or plastic, and has an inside diameter substantially equal to the outside diameter of inner end 302 of hub means 303. Outer ends 304 of hub means 303 have a keying projection 305 which is adapted to fit into key means such as a female key 306 in the center of operating wheel or disc 307, at the inner side thereof. On the outer side of operating wheel 307 we provide an axis means 308. The axis means may be a continuation of the material of disc 307, such as a molded plastic disc or a turned or whittled wooden disc, or it may actually be a steel pin or any other means to serve as a hub for disc 307.

We also provide a box 310 having a bottom portion 311 with provision at the sides 312 and 313 to have bearing means for the axis means of the disc 307. In the form of invention shown, these bearing means 314 are in the shape of U-shaped cuts on auxiliary sides 312a and 313a which are fiitted inside sides 312 and 313 respectively.

We also provide a working surface 320 over which web 300 is adapted to be reeled. In this form of the invention, working surface 320 is made of paperboard, and has sides 321 and 322, and this construction is inserted centrally in the box bottom 311. The diameter of wheels or discs 307 is sufficiently wide so that when the axis means 308 are resting on the bearings 314, the circumference 325 of disc 307 will come to a level higher than the top of the box 310. We provide a cover 326 adapted to fit over the bottom 311 and having one or more observation stations 327 and 328 as well as four cuts 329 adapted to fit over the extending circumferences 325 of wheels 307.

Thus, when all components are in place, the circumferences 325 may be pushed by the fingers or thumbs of the user in the direction of the arrows as shown in FIG. 31 to move the web 300 in the direction of the arrow F in FIG. 30. Web 300 is reeled on a reel 301 and set into the device as shown at point identified as RS in FIG. 30 of the drawings. The web 300 is reeled from reel 301 at position RS over working surface 320 and over and around the reel 301 of position RF as shown in FIG. 30. After the web 300 is reeled on reel 301 at RF, the box 310 is opened and the reel 301 is removed and changed with reel 301 at position RS. The reels are now in reverse position, and the other side of web 300 can be viewed through observation stations 327 and 328.

The purpose of providing discs 307 separately from hubs 303 and sleeves 301 is so that these may remain with the device for use interchangeably with web reeling sleeves 301 having different programs.

In still another form of this invention we may provide a structure as shown in FIGS. 32 through 37 of the drawings. In this form of invention, the web 400 is reeled on a web reeling sleeve 401 made of board or plastic which has an inside diameter substantially equal to the outside diameter of the inner hub of operating wheel or disc 403. Operating wheel or disc 403 has an outer hub 404.

In this form of the device, we provide an inner frame structure which comprises a blank 410 made of cardboard, paperboard or other scoreable or foldable material. The blank is scored or punched for folding as follows. Holes 411 are punched out to provide bearing means for the outer hubs 404 of the operating wheels 403. Scoring or punching means are provided so that tabs 412 may be punched out of sides 416 when the sides are folded down along folding score lines 414. Slits 413 are punched out of the sides 416 so that tabs 412 may be fitted into the slits when sides 417 are folded down along folding score lines 415.

The assembled inner frame can be seen in FIG. 37 of the drawings. Thus, when the inner frame is assembled, the web 400 travels over a working surface 420 which is then provided on the top of the frame. The box 421 is formed by blank 422. This box may be formed in any manner usual and proper in the box making art, and may be made of board, paperboard or other suitable material. The box will compise a bottom 423, a top 424, sides 425 and 426 and ends 427 and 428.

The top 424 is provided with one or more observation stations 430 and 431, and four slits 432, out of which wheels 403 may protrude when the complete box 421 is put together. It can thus be seen that turning wheels 403 in the direction of arrows shown in FIG. 32 of the drawings will move the web in the same direction.

In this construction, the diameter of wheels 403 must be large enough so that they will protrude from the slits 432 when installed on the bearings 411 of the inner frame blank 410. To complete the device, the box 421 is assembled, and the inner frame, together with web, is slid through one of the open ends 427 or 428, the wheels are permitted to come out of the slits 432, and then the end is closed. The box 421 is then assembled, and the program may be viewed on the web by turning the wheels 403 in the same direction.

It is apparent that a wide and varied combination of elements is possible through the use of the cartridges as provided by all of the forms of our invention disclosed herein.

Programs utilizing this type of device will normally use instructional items, which are adapted to permit the student to obtain the correct answer, leading him very carefully along the direction desired. However, if the student makes an incorrect response, it is desirable at the time it is made to expose a referral number which will direct him to alternate information or, actually present the referral information directly at this time. A student may also indicate whether his response was correct or incorrect, so that the teachers may make whatever observations are necessary with respect to the student program and the efficiency of the program structure.

Among the advantages of the modular units are: The programs and answer tapes are self-contained. The program portion cartridge may be reused indefinitely. The answer cartridges may be submitted to the teacher, without interfering with the utility of the question cartridge, for checking or verification if so desired, and is a disposable item. The programs may vary in length at the discretion of the educational experts who prepare them. They may contain, if desired, either the entire program and answers, or be separated, to be used in conjunction with a corresponding answer portion housing in its own cartridge. When the answer cartridge is disposable in the manner described above, the bulk program is re-usable constantly, which is an excellent advantage for both the school system and the student who wishes to re-study the materials.

The cartridges may be made reversible by the simple expedient of turning them over. This permits a smaller paper consumption with resultant economies in production and use. Each cartridge may be adapted so that its basic feed may be either from roll to roll, from folded strips to roll, or a set of index cards or strips which are simply pushed, through an opening in the housing, into and out of the observation station. For example, a supply of index cards may be provided below the observation station with tabs which extend below an opening in the housing for finger actuation. The student simply pushes the cards, one at a time, to the observation station and then to a collection box. The cards may also be stacked under the observation station and simply pushed out of such location one at a time. In the case of a separate answer cartridge, it may be turned in, in its original sealed form, to the teacher for examination. The program portions of the cartridges remain continuously sealed and may be stored and submitted to the teacher or to the library, or used in the home in their sealed form. The problem of compromising the program when loading is removed. When used in conjunction with either a simple or more complex machine, this permits freeing the machine at any time desired by the simple expedient of slipping out the cartridge and storing them until the next time the student will use the machine. With many current devices, a longer program ties up the machine for a long period of time.

Additional advantages are that the cartridges may contain paper, film, a combination of both, or other materials to be used for projection, exposure, advancement or such, for any basic device. The machines may be used in conjunction with, or to control any audio visual apparatus, the answer tape or program tape containing preprinted symbols, magnetic impulses, conductive inks or printed circuits which will activate various devices, electrically, electronically, or mechanically. The paper tape might activate a printed circuit relay, for example, as shown in the circuit of FIG. 10; a contact finger might push against an aluminum strip to activate any desired device; or a small projection such as a rivet sealed into the tape might release a spring which activates a mechanical counter, or releases a spring to open a window or perform any other function.

The answer tape may use chemically treated inks or paper which will give color indications on correct or incorrect responses for multiple choice, referrals or other situations, as desired. The ink impressions would appear light to the eye, and when touched with water or other suitable reagents would give distinct colorations. These colors may be exposed automatically by a small wheel or damp sponge running across the tape moistening the chosen response. Thus, for example, if the answer section corresponding to frame No. 1 were wrong, a distinctive color would appear on the answer frame No. 1, where this would be instantaneously observable to whoever reviewed the programs.

The modules and cartridges allow the teaching machine to be completely realiable, quiet, and extremely easy to operate. No special apparatus other than a simple housing is required when the cartridges are used. The program frames and the answer response frames are always at the same level and exposed in the proper sequence, positioning themselves automatically. If used, the one-way ratchet may be part and parcel of the cartridge, or be part of an external housing. The spindles, dowels, or other materials forming the roller sections may protrude through the cartridges or may be slotted so that they may turn only by key or ratchet, entering the box from an internal housing.

The programs may be filed on shelves or in drawers, just as with books, the larger programs being separated into chapters, each chapter having its own cartridge. The materials are freed from the normal wear and tear of the text book which is continuously handled directly by the student.

Either one dowel or two may be used to operate the machine. Catridges or modules may be equipped with color filters which permit dual channels of appropriately colored information to be carried.

While the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

Wherefore we claim:

1. A teaching device formed of cooperably related modular units comprising at least one program cartridge and at least one answer cartridge, said at least one program cartridge comprising a housing, a working surface associated with said housing and having an observation station comprising a window thereon, a program sheet containing stimuli supported within said housing for feeding to said observation station, said station being adapted for exposing a predetermined portion of said program stimuli in said window for viewing by an observer, take-up means within said housing for moving a predetermined portion of said program sheet uni-directionally to said observation station, means coupling said program take-up means with a take-up means of said at least one answer cartridge, said answer catridge similarly comprising a housing, a working surface associated with said housing and having an observation station comprising a window thereon, an answer sheet supported within said housing containing concealable correct answers adapted to be fed in synchrony with the program sheet contained in said program cartridge by means of said coupled answer takeup means within said answer housing, opaque masking means associated with the window of said answer catridge for concealing a correct answer while exposing a predetermined portion of said answer sheet for recording thereon an answer by an observer, and a space within the window above the opaque masking means for exposing said correct answer for comparison with a recorded answer after the insertion thereof and movement of the answer sheet from beneath the opaque mask.

2. A teaching device formed of cooperably related modular units comprising at least one program cartridge and at least one answer cartridge, said at least one program cartridge comprising a housing, a working surface associated with said housing and having an observation station comprising a window thereon, a program sheet containing stimuli unwindingly supported on a spool within said housing for feeding to said observation station, said station being adapted for exposing a predetermined portion of said program stimuli in said window for viewing by an observer, a take-up spool within said housing for winding said program sheet and moving a predetermined portion of said program sheet uni-directionally to said observation station, means coupling said program take-up spool with a take-up spool of said at least one answer cartridge, said answer cartridge similarly comprising a housing, a working surface associated with said housing and also having an observation station comprising a window thereon, an answer sheet unwindingly supported on a spool within said housing containing concealable correct answers adapted to be fed in synchrony with the program sheet contained in said program catridge by means of said coupled answer take-up pool within said answer housing, opaque masking means associated with the window of said answer cartridge for concealing the correct answer while exposing a predetermined portion of said answer sheet for recording thereon an answer by an observer, and a space within the window above the opaque masking means for exposing said correct answer for immediate comparison with a recorded answer after the insertion thereof and movement of the answer sheet from beneath the opaque mask.

3. The device of claim 2 wherein each of the catridge windows of the observation stations comprises slots in the surface of the housing through which the sheet material is threaded for exposing a predetermined portion thereof to an observer.

4. The device of claim 3 wherein the window in each of the cartridges has a transparent member overlying it and securely mounted to the surface of said housing except for a cut-out portion in the case of the answer cartridge for exposing a space on said answer sheet to render it accessible for recording answer data thereon adjacent said concealed correct answer.

References Cited
UNITED STATES PATENTS

| | | | |
|---|---|---|---|
| 2,837,839 | 6/1958 | Fernbach | 35—76 |
| 3,056,215 | 10/1962 | Skinner | 35—9 |
| 2,800,330 | 7/1957 | Pickard | 40—86 |
| 2,425,197 | 8/1947 | Montague | 35—76 |
| 2,924,889 | 2/1960 | Di Lauro | 35—9 |
| 3,081,560 | 3/1963 | Campo Agud | 35—35 |
| 2,087,043 | 7/1937 | Phillips | 35—76 |
| 1,530,418 | 3/1925 | Saylor | 35—76 |

EUGENE R. CAPOZIO, *Primary Examiner.*

W. H. GRIEB, *Examiner.*

UNITED STATES PATENT OFFICE
CERTIFICATE OF CORRECTION

Patent No. 3,392,460                          July 16, 1968

Alexander Schure et al.

It is certified that error appears in the above identified patent and that said Letters Patent are hereby corrected as shown below:

Column 1, line 14, "No. 3,046,675, issued July 31, 1962" should read -- No. 3,392,459, issued July 16, 1968 --. Column 15, line 21, "pool" should read -- spool --.

Signed and sealed this 25th day of November 1969.

(SEAL)
Attest:

Edward M. Fletcher, Jr.                      WILLIAM E. SCHUYLER, JR.
Attesting Officer                              Commissioner of Patents